United States Patent
Rustagi et al.

(10) Patent No.: US 11,948,276 B2
(45) Date of Patent: Apr. 2, 2024

(54) APPARATUS AND METHOD FOR ENHANCING VIDEOS

(71) Applicant: SAMSUNG ELECTRONICS CO., LTD., Suwon-si (KR)

(72) Inventors: Shubham Rustagi, Bengaluru (IN); Sathish Cherukuri, Bengaluru (IN); Shashi Kumar Parwani, Bengaluru (IN); Mineni Niswanth Babu, Bengaluru (IN); Prasenjit Chakraborty, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/150,800

(22) Filed: Jan. 15, 2021

(65) Prior Publication Data

US 2021/0224956 A1 Jul. 22, 2021

(30) Foreign Application Priority Data

Jan. 16, 2020 (IN) .............................. 202041001985
Dec. 10, 2020 (IN) .............................. 202041001985

(51) Int. Cl.
*G06T 5/00* (2006.01)
*G06V 20/40* (2022.01)
*G11B 27/031* (2006.01)

(52) U.S. Cl.
CPC .............. *G06T 5/002* (2013.01); *G06V 20/49* (2022.01); *G11B 27/031* (2013.01); *G06T 2200/24* (2013.01); *G06T 2207/10016* (2013.01)

(58) Field of Classification Search
None
See application file for complete search history.

(56) References Cited

U.S. PATENT DOCUMENTS 7,356,830 B1 * 4/2008 Dimitrova ............. G06F 16/748
  725/112
9,256,955 B2   2/2016 O'Gorman et al.
(Continued)

FOREIGN PATENT DOCUMENTS

CN         109379625 A    2/2019
KR   10-2014-0043264 A    4/2014
(Continued)

OTHER PUBLICATIONS

Kuehne, H., et al., "HMDB: A Large Video Database for Human Motion Recognition", 2011, 8 pages.
(Continued)

*Primary Examiner* — Gelek W Topgyal
(74) *Attorney, Agent, or Firm* — Sughrue Mion, PLLC

(57) ABSTRACT

A computer-implemented method includes obtaining, from a storage, a video to be enhanced, based on a selection of a user; determining corresponding sets of object scores for a plurality of objects identified in the video, respectively, based on a set of predetermined factors; identifying a primary object and one or more secondary objects in the video, among the plurality of objects, based on the corresponding sets of object scores; and applying at least one visual effect to the primary object and at least one secondary object, from the one or more secondary objects, in at least a portion of the video, for obtaining an enhanced video with the at least one visual effect applied at least to the portion of the video.

18 Claims, 10 Drawing Sheets

(56) References Cited

U.S. PATENT DOCUMENTS

| | | | |
|---|---|---|---|
| 9,620,168 B1* | 4/2017 | Townsend | G06V 20/47 |
| 10,073,910 B2* | 9/2018 | Baek | G11B 27/28 |
| 10,116,901 B2 | 10/2018 | Shaburov et al. | |
| 10,319,410 B1* | 6/2019 | Townsend | G11B 27/30 |
| 10,474,877 B2 | 11/2019 | Huang et al. | |
| 10,541,000 B1* | 1/2020 | Karakotsios | H04N 21/25891 |
| 10,592,750 B1* | 3/2020 | Yavagal | H04N 23/69 |
| 10,657,364 B2 | 5/2020 | El-Khamy et al. | |
| 10,721,388 B2 | 7/2020 | Jiang et al. | |
| 10,811,050 B2* | 10/2020 | Shakib | G06F 3/0488 |
| 11,132,398 B2* | 9/2021 | Park | G06V 20/47 |
| 11,158,344 B1* | 10/2021 | Townsend | H04N 9/79 |
| 2012/0099793 A1* | 4/2012 | Kumar | G11B 27/28 382/190 |
| 2012/0154684 A1* | 6/2012 | Luo | G11B 27/28 348/700 |
| 2013/0216094 A1* | 8/2013 | DeLean | G06V 40/20 382/103 |
| 2013/0279881 A1* | 10/2013 | Lu | H04N 5/91 386/E9.011 |
| 2014/0037269 A1* | 2/2014 | Kumar | G11B 27/28 386/E5.028 |
| 2014/0046914 A1 | 2/2014 | Das et al. | |
| 2014/0085296 A1 | 3/2014 | Baik | |
| 2015/0146043 A1 | 5/2015 | Ahonen et al. | |
| 2016/0034748 A1* | 2/2016 | Wang | G06V 10/462 382/201 |
| 2016/0307044 A1* | 10/2016 | Marilly | G06V 20/41 |
| 2017/0278546 A1 | 9/2017 | Xiao et al. | |
| 2017/0285916 A1 | 10/2017 | Xu et al. | |
| 2018/0005040 A1 | 1/2018 | Babenko et al. | |
| 2018/0089505 A1 | 3/2018 | El-Khamy et al. | |
| 2018/0132011 A1 | 5/2018 | Shichman et al. | |
| 2019/0019060 A1 | 1/2019 | Yu | |
| 2019/0051127 A1 | 2/2019 | Kanga et al. | |
| 2019/0065895 A1* | 2/2019 | Wang | G06V 40/161 |
| 2019/0182436 A1* | 6/2019 | Gupta | H04N 5/272 |
| 2019/0198057 A1* | 6/2019 | Cheung | G06F 16/9535 |
| 2019/0384984 A1* | 12/2019 | Rav-Acha | G06V 20/49 |
| 2020/0082549 A1* | 3/2020 | Dehghan | G06V 40/172 |
| 2021/0281771 A1 | 9/2021 | Yang | |
| 2021/0390710 A1* | 12/2021 | Zhang | G06F 3/04845 |

FOREIGN PATENT DOCUMENTS

| | | | |
|---|---|---|---|
| KR | 10-2015-0043958 A | 4/2015 | |
| KR | 10-2018-0033037 A | 4/2018 | |

OTHER PUBLICATIONS

Soomro, K., et al., "UCF101: A Dataset of 101 Human Actions Classes From Videos in the Wild", Center for Research in Computer Vision, arXiv:1212.0402v1 [cs.CV] Dec. 3, 2012, pp. 1-7.
Karpathy, A., et al., "Large-scale Video Classification with Convolutional Neural Networks", 2014, 8 pages.
Sigurdsson, G., et al., "Hollywood in Homes: Crowdsourcing Data Collection for Activity Understanding", arXiv:1604.01753v3 [cs.CV] Jul. 26, 2016, pp. 1-17.
Heilbron, F., et al., "ActivityNet: A Large-Scale Video Benchmark for Human Activity Understanding", IEEE, 2015, pp. 961-970.
Kay, W., et al., "The Kinetics Human Action Video Dataset", arXiv:1705.06950v1 [cs.CV] May 19, 2017, pp. 1-22.
Abu-El-Haija, S., et al., "YouTube-8M: A Large-Scale Video Classification Benchmark", http://rsearch.google.com/youtube8m, arXiv:1609.08675v1 [cs.CV] Sep. 27, 2016, 10 pages.
Gu, C., et al., "AVA: A Video Dataset of Spatio-temporally Localized Atomic Visual Actions", arXiv: 1705.08421v4 [cs.CV] Apr. 30, 2018, 15 pages.
Goyal, R., et al., "The "something something" video database for learning and evaluating visual common sense", arXiv:1706.04261v2 [cs.CV] Jun. 15, 2017, pp. 1-21.

Materzynska, J., et al., "The Jester Dataset: A Large-Scale Video Dataset of Human Gestures", IEEE, 2019, 9 pages.
Rohrbach, A. et al., "Movie Description", arXiv:1605.03705v1 [cs.CV] May 12, 2016, pp. 1-25.
Weinzaepfel, P., et al., "Human Action Localization with Sparse Spatial Supervision", arXiv:1605.05197v2 [cs.CV] May 23, 2017, pp. 1-14.
Rohrbach, M., et al., "A Database for Fine Grained Activity Detection of Cooking Activities", Max Planck Institute for Informatics, IEEE Conference on Computer Vision and Pattern Recognition, Jun. 2012, pp. 1-8.
Marszalek, M., et al., "Actions in Context", 2009, 8 pages.
Tran, D., et al., "VideoMCC: a New Benchmark for Video Comprehension", arXiv:1606.07373v5 [cs. CV] Jun. 16, 2017, pp. 1-13.
Tapaswi, M. et al., "MovieQA: Understanding Stories in Movies through Question-Answering". http://movieqa.cs.toronto.edu, 10 pages.
Krishna, R., et al., "Dense-Captioning Events in Videos", arXiv:1705.00754v1 [cs.CV] May 2, 2017, pp. 1-16.
Real, E., et al., "YouTube-BoundingBoxes: A Large High-Precision Human-Annotated Data Set for Object Detection in Video", arXiv:1702.00824v5 [cs.CV] Mar. 24, 2017.
Perazzi, F., et al., "A Benchmark Dataset and Evaluation Methodology for Video Object Segmentation", IEEE, 2016, pp. 724-732.
Jiang, Y-G., et al., "Exploiting Feature and Class Relationships in Video Categorization with Regularized Deep Neural Networks", arXiv:1502.07209v1 [cs.CV] Feb. 25, 2015, pp. 1-22.
Charles, J., et al., "Personalizing Human Video Pose Estimation", arXiv:1511.06676v1 [cs.CV] Nov. 20, 2015, 12 pages.
Thomee, B., et al., "YFCC100M: The New Data in Multimedia Research", arXiv:1503.01817v2 [cs.MM] Apr. 25, 2016, 8 pages.
Kliper-Gross, O. et al., "The Action Similarity Labeling Challenge", IEEE Transactions on Pattern Analysis and Machine Intelligence, vol. 34, No. X, 2012, 7 pages.
Alayrac, J-B., et al., "Unsupervised Learning from Narrated Instructions Videos", arXiv:1506.09215v4 [cs.CV] Jun. 28, 2016, pp. 1-21.
Xu, J., et al., "MSR-VTT: A Large Video Description Dataset for Bridging Video and Language", 2016, 9 pages.
Zhao, H., et al., "HACS: Human Action Clips and Segment Dataset for Recognition and Temporal Localization", arXiv:1712.09374v3 [cs.CV] Sep. 4, 2019, 11 pages.
Fouhey, D., et al., "From Lifestyle Vlogs to Everyday Interactions", arXiv:1712.02310v1 [cs. CV] Dec. 6, 2017, 11 pages.
Monfort, M., et al., "Moments in Time Dataset: one million videos for event understanding", arXiv:1801.03150v3 [cs.CV] Feb. 16, 2019, pp. 1-8.
Zhou, L., et al., "Towards Automatic Learning of Procedures from Web Instructional Videos", arXiv:1703.09788v3 [cs.CV] Nov. 21, 2017, 10 pages.
Damen, D., et al., "Scaling Egocentric Vision: The Epic-Kitchens Dataset", arXiv:1804.02748v2 [cs.CV] Jul. 31, 2018, pp. 1-19.
Sanabria, R., et al.,"How2: A Large-scale Sataset for Multimodal Language Understanding" arXiv:1811.00347v2 [cs.CL] Dec. 7, 2018, pp. 1-12.
Zisserman, A., "Human action recognition and the Kinetics dataset", DeepMind, 2018, 52 pages.
Diba, A., et al., "Holistic Large Scale Video Understanding", arXiv:1904.11451v1 [cs.CV] Apr. 25, 2019, pp. 1-10.
Huang, Q., et al., "MovieNet: A Holistic Dataset for Movie Understanding", arXiv:2007.10937v1 [cs.CV] Jul. 21, 2020, 58 pages.
Epstein, D., et al., "OOPS! Predicting Unintentional Action in Video", oops.cs.columbia.edu, arXiv:1911.11206v1 [cs.CV] Nov. 25, 2019, 11 pages.
Miech, A., et al., "HowTo100M: Learning a Text-Video Embedding by Watching Hundred Million Narrated Video Clips", https://www.di.ens.fr/willow/research/howto100m, arXiv:1906.03327v2 [cs.CV] Jul. 31, 2019, 14 pages.
Li, Y., et al., "TGIF: A New Dataset and Benchmark on Animated GIF Description", arXiv:1604.02748v2 [cs.CV] Apr. 12, 2016, 15 pages.
Vicol, P., et al., "MovieGraphs: Towards Understanding Human-Centric Situations from Videos", http://moviegraphs.cs.toronto.edu, arXiv:1712.06761v2 [cs.CV] Apr. 15, 2018, 23 pages.

(56) References Cited

OTHER PUBLICATIONS

Wang, X., et al., "Vatex: A Large-Scale, High-Quality Multilingual Dataset for Video-and-Language Research", arXiv:1904.03493v1 [cs.CV] Apr. 6, 2019, 16 pages.
Zhukov, D., et al., "Cross-task weakly supervised learning from instructional videos", arXiv:1903.08225v2 [cs. CV] Apr. 29, 2019, 18 pages.
Tang, Y., et al., "COIN: A Large-scale Dataset for Comprehensive Instructional Video Analysis", https://coin-dataset.github.io/, arXiv:1903.02874v1 [cs. CV] Mar. 7, 2019, 12 pages.
International Search Report (PCT/ISA/210) dated May 4, 2021 by the International Searching Authority in International Patent Application No. PCT/KR2021/000580.
Written Opinion (PCT/ISA/237) dated May 4, 2021 by the International Searching Authority in International Patent Application No. PCT/KR2021/000580.
Communication dated Dec. 20, 2021 by the Intellectual Property Office of India in Indian Patent Application No. 202041001985.

* cited by examiner

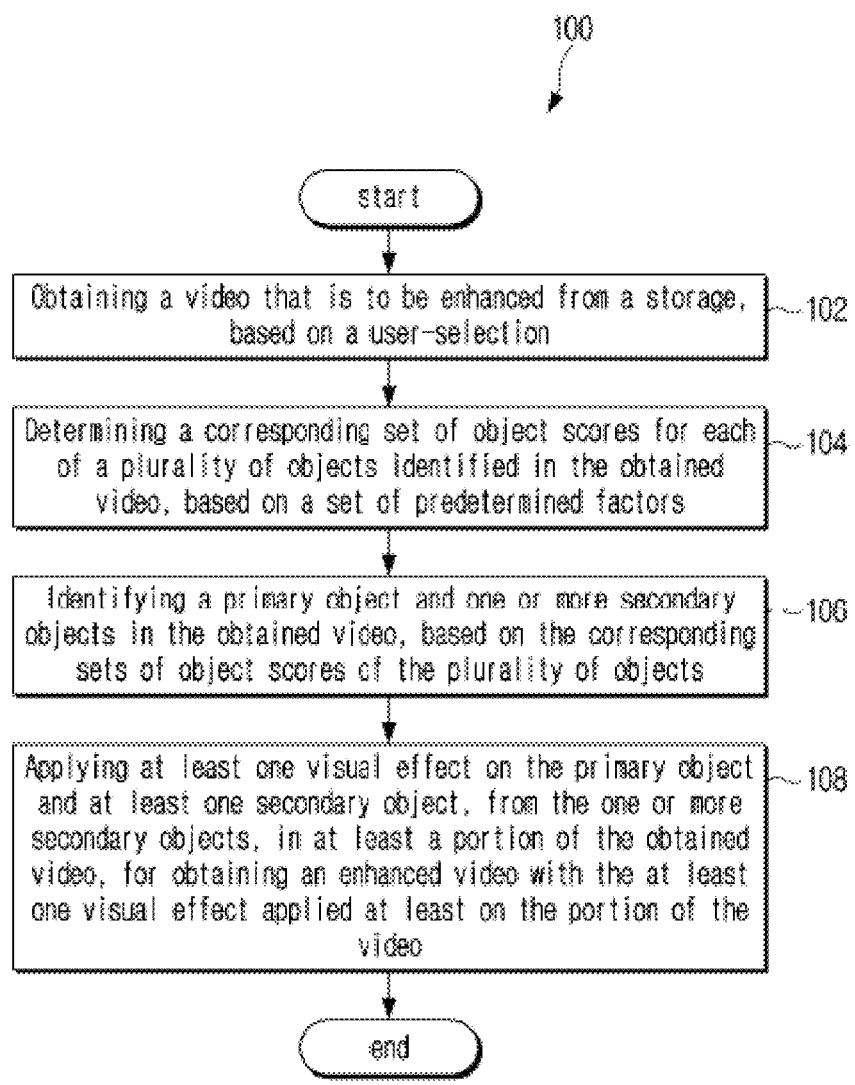

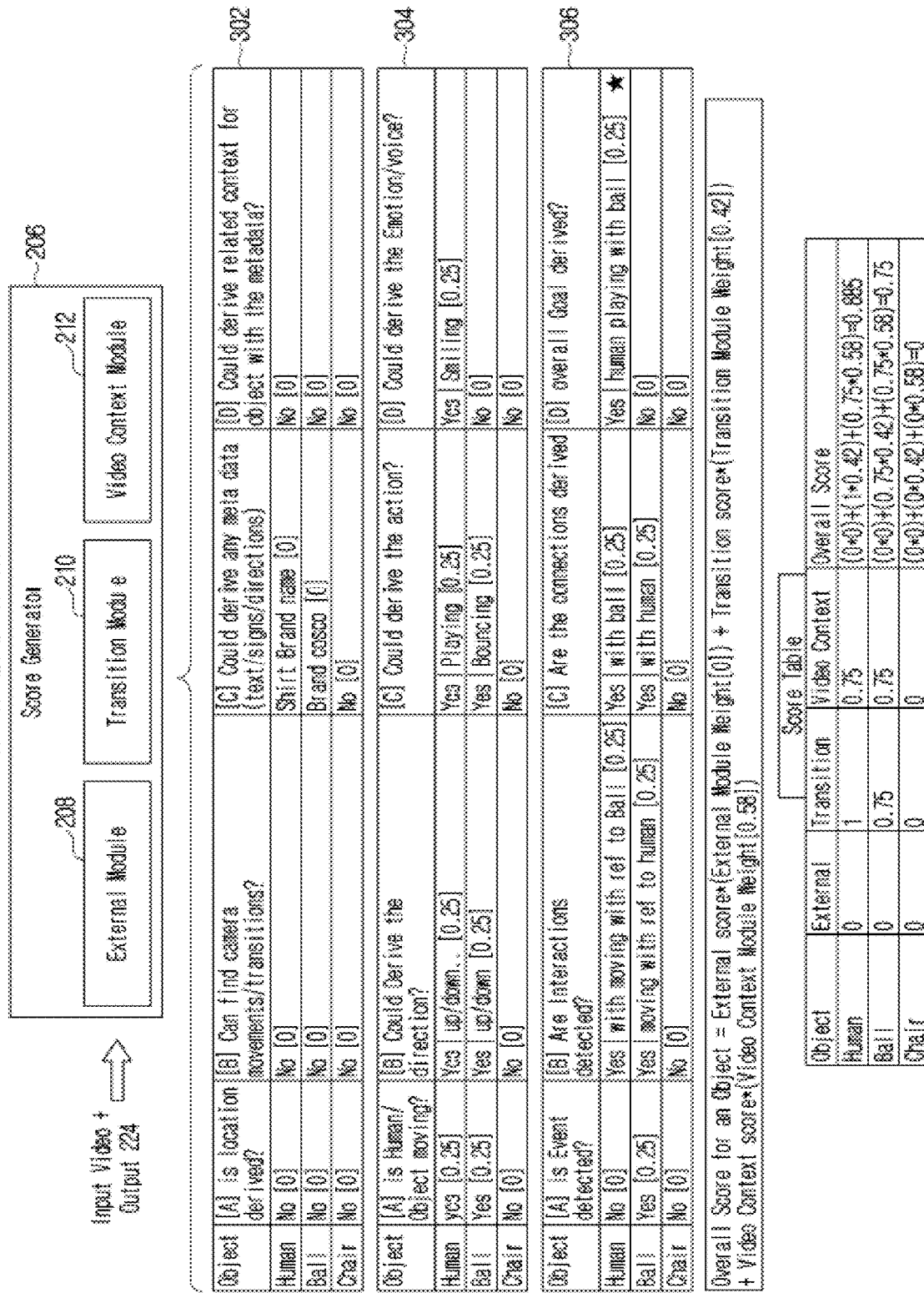

APPARATUS AND METHOD FOR ENHANCING VIDEOS

CROSS-REFERENCE TO RELATED APPLICATION(S)

This application is based on and claims priority under 35 U.S.C. § 119 to Indian Provisional Patent Application No. 202041001985, filed on Jan. 16, 2020 in the Indian Intellectual Property Office, and Indian Patent Application No. 202041001985, filed on Dec. 10, 2020 in the Indian Intellectual Property Office, the disclosures of which are incorporated by reference herein in their entireties.

BACKGROUND

1. Field

The disclosure relates to processing videos and, in particular, to application of visual effects on videos for enhancing the video.

2. Description of Related Art

With the advancement in multimedia processing techniques, it is common to see multimedia content, such as videos, wherein special visual effects have been implemented. Examples of the video effects include blurring, fading, and zooming.

In a related art technique of applying visual effects to a video, a user may select the video and may thereafter select the visual affect that is to be applied. Subsequently, the user is required to select a region of the video in which the visual effect is to be applied. This might prove to be a cumbersome task for the user.

The related art techniques offering solutions to apply the visual effects offer limited enhancement platform in that the application of the visual effect is limited to only primary objects identified in the video. Thus, in a scenario where an individual desires to apply a blurring feature on the video in which an object is doing a product demo, the application of a blurring feature might result in having the product being blurred instead of, for example, the background objects. Accordingly, the individual's intent of applying special visual effects to the video might not be carried out correctly owing to the technical challenges associated with related art methods.

SUMMARY

Additional aspects will be set forth in part in the description which follows and, in part, will be apparent from the description, or may be learned by practice of the presented embodiments.

In accordance with an aspect of the disclosure, there is provided a computer-implemented method of enhancing videos. The method includes obtaining, from a storage, a video to be enhanced, based on a selection of a user; determining corresponding sets of object scores for a plurality of objects identified in the video, respectively, based on a set of predetermined factors; identifying a primary object and one or more secondary objects in the video, among the plurality of objects, based on the corresponding sets of object scores; and applying at least one visual effect to the primary object and at least one secondary object, from the one or more secondary objects, in at least a portion of the video, for obtaining an enhanced video with the at least one visual effect applied at least to the portion of the video.

In accordance with an aspect of the disclosure, there is provided an apparatus configured to enhance videos. The apparatus may include a memory; a communication unit; and a processor coupled to the memory and the communication unit. The processor is configured to: obtain, from a storage, a video to be enhanced, based on a selection of a user, determine corresponding sets of object scores for a plurality of objects identified in the video, respectively, based on a set of predetermined factors, identify a primary object and one or more secondary objects in the video, among the plurality of objects, based on the corresponding sets of object scores, and apply at least one visual effect to the primary object and at least one secondary object, from the one or more secondary objects, in at least a portion of the video, for obtaining an enhanced video with the at least one visual effect applied at least to the portion of the video.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1 illustrates a flowchart of a method of enhancing videos, according to an embodiment;

FIG. 3B illustrates operation of the score generator to determine a set of scores corresponding to an object in a video, according to an embodiment.

DETAILED DESCRIPTION

Figure 2A:
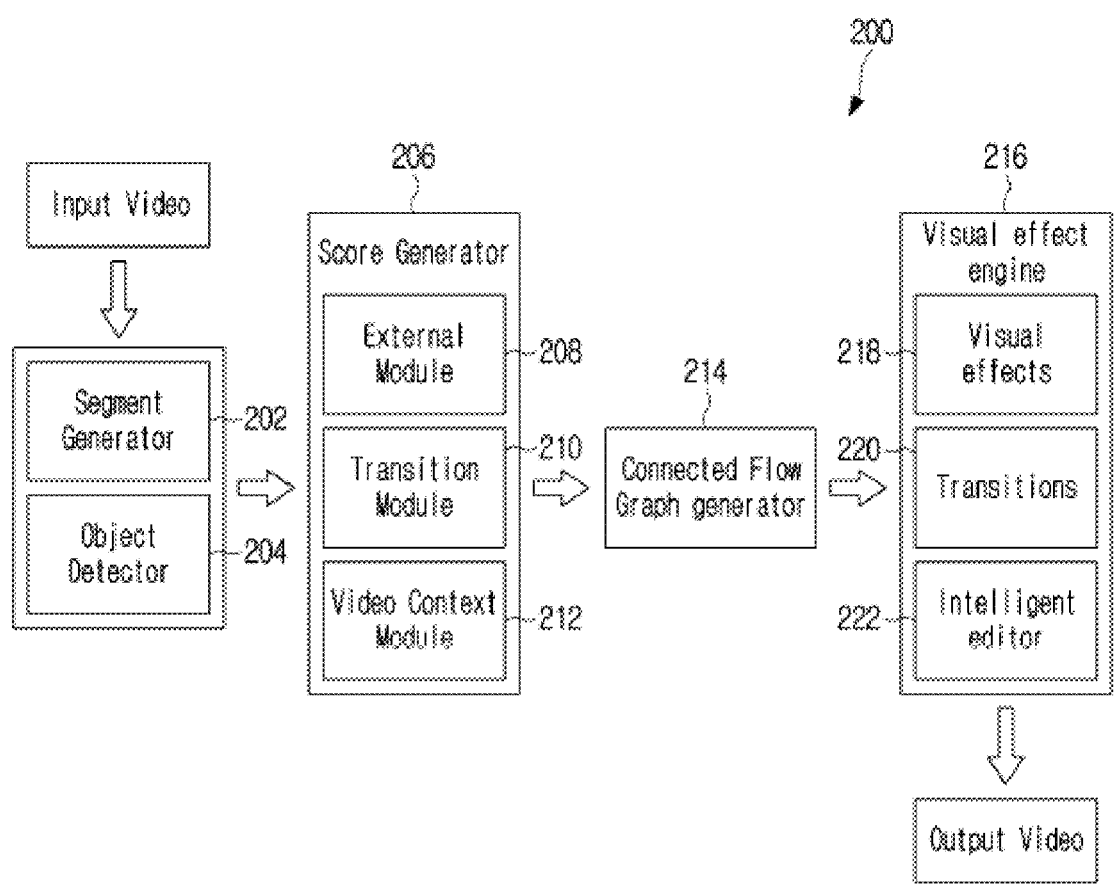
FIG. 2A illustrates an apparatus configured to enhance videos, according to an embodiment.

For the purpose of promoting an understanding of the principles of embodiments, reference will now be made to certain embodiments with reference to the drawings and specific language will be used to describe the same. It will nevertheless be understood that no limitation of the scope of embodiments is thereby intended, such alterations and further modifications in the illustrated system, and such further applications of the principles of embodiments as illustrated therein being contemplated as would be appreciated by those skilled in the art.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art. The apparatus, methods, and examples provided herein are illustrative only and not intended to be limiting.

Certain embodiments will be described below in detail with reference to the accompanying drawings.

FIG. 1 illustrates a flowchart of a method 100 of enhancing videos, according to an embodiment. In an example, the method 100 may be implemented in computing devices, such as, for example, a laptop, a smartphone, a tablet, a desktop computer, a server, etc. In an example, a user may operate the computing device implementing the method 100 for enhancing one or more videos. In an example and without limitation, the enhancement of a video may be understood as application of a visual effect to the video or at least a portion thereof. The enhancements include, but are not limited to, blurring, magnifying, zooming in and out, motion blurring, sharpening, etc.

According to an embodiment, the enhancement of the video results in application of the visual effects not only to a primary object, but also to a secondary object present in a given frame. In an example, in a given video, an object may be determined to be a primary object based on one or more factors, such as, for example, maximum visibility in the plurality of frames of the video, involvement in maximum number of actions, involvement in maximum number of actions, performance of more interactions in comparison to other objects, and performing of actions relating to a theme of the video. In an example and without limitation, the objects other than the primary object in a given frame may be determined to be the secondary object. With the application of the visual effects to both the primary object and the secondary object, an experience of the user who is viewing the video is enhanced. For instance, consider a scenario where a person has recorded a video where the person is demonstrating unboxing of a product. In the related art solutions, only the person may be focused upon and rest all portions of the frame may be blurred. This might not be a desirable output in case of the person who is doing the product unboxing, as attention to the product might also be required. According to an embodiment, both the person and the product may be focused upon, thereby improving the user experience and solving the underlying technical problem of limited focus or selected focus in videos. Furthermore, as the detection of the secondary objects is done automatically, an embodiment provides for an intelligent solution of focusing on objects that are relevant to the theme of the video.

In an embodiment, in operation 102, the method 100 includes obtaining a video that is to be enhanced from a storage, based on a user selection. In an example, a user who is seeking to enhance a video may select the video. The selection of the video may be done from an internal storage of the computing device performing the method 100. In another example, the selection may be done from an external storage that is communicatively coupled to the computing device. For instance, the external storage may be a cloud storage or an external disk, storing the video thereon. In such a case, the user may access a location of the video and subsequently select the video. Once the video is selected, a processor of a computing device in which the method 100 is being implemented, may obtain the video from the storage.

In operation 104, the method 100 includes determining a corresponding set of object scores for each of a plurality of objects identified in the obtained video, based on a set of predetermined factors. In an example, the set of predetermined factors may include a set of external factors, a set of transition factors, and a set of video context factors. For determining the object score corresponding to a given object, all of the frames in the video in which the object is appearing may be identified. Subsequently, the analysis of the aforementioned predetermined factors may be determined for each of the frames and accordingly an object score for the object for each frame may be calculated. The object scores corresponding to all of the frames are collectively referred to as the set of object scores.

In an example, the set of external factors may include a location-based factor, i.e., whether a location is present in a given frame or not. Accordingly, deductions as to whether the object is in vicinity to or interacting with the monument may be taken into account. The set of external factors may include camera movements, i.e., camera transitions, zoom, focus changes, etc. The camera movements may be analyzed with respect to the object. Furthermore, the set of external factors may include text and direction recognition. Herein, relevant text and direction could be utilized. For example, if the direction of the camera is towards the object or not, if a given text is related to the object or not, etc.

In an example, the set of video context factors may include event trackers, event detection, goal recognition, and unique elements. Herein, one or more events may be identified in the video and accordingly, the objects participation with respect to the one or more events may be analyzed. Furthermore, based on the one or more events, an eventual goal of the video may be determined and accordingly, the objects participation in that goal may be determined. Furthermore, unique elements present in the video and which are relevant to the video may be identified and the objects associated therewith may be analyzed. As an example, consider a user A who is having a birthday party. When a video is made and analyzed, the user A may be scoring high, as he may be very much connected with the events, e.g., cake cutting, celebrations, cake eating, and unique elements, e.g., a hat, gifts receiving, etc.

In an example, the set of transition factors may include actions, emotions, voices, reactions to the actions. The actions may be any movements or gestures made by the object. The emotions include the emotions that may be exhibited by the object. The voices may include voices that may be relevant to the video, for example, foreground voices. The reactions to the actions include the response movements to the movements of other objects in the given frame.

In an embodiment, after obtaining the video, at first, a weight of each of the set of predetermined factors may be determined, based on the processing of the obtained video. Herein, one or more machine learning techniques may be applied that has been trained using training that that has been tagged for identification of objects, emotions, actions, places, monuments, events, etc. Accordingly, for a given video, a weight for each set of factors may be calculated. Thus, weights W1, W2, and W3 may be calculated corresponding to the predetermined factor set.

In an example, for a given set, for every factor detected in the video, a preset value is added. Accordingly, the total sum of factors for the given set is calculated. The sum of factors for each of the sets may be combined to arrive at the total weight of the sets. Thereafter, each sets total sum of factors may be divided by the total weight of the sets to determine the weight of the set. An example table illustrating the weights is shown below.

Example Table

| Set (S) | Set Weight (SW) | Final Set Weight (FSW) = SW/Total |
|---|---|---|
| External Factors | 0 | 0 |
| Transition Factors | 0.75 | 0.42 |
| Video context factors | 1 | 0.58 |
| Total | 1.75 | — |

Subsequently, an identification and classification technique may be applied to the obtained video for identifying the different objects present in the video. In an embodiment, each of the identified objects may be classified into different categories. As an example, in a given video, the objects may be classified into categories such as persons, things, text, etc., with each category having one or more objects classified therein.

In an embodiment, for each object, corresponding frames in which the object is appearing throughout the video may be identified. Subsequently, an object score for the object in each of the frames may be computed based on the set of predetermined factors, and the weights. Herein, at first, an external factor score, a transition score and a video context score for the object may be calculated, based on the set of external factors, the set of transition factors, and the set of video context factors, respectively. Thereafter, the score of the object in a given frame may be determined as follows:

Object score in a frame=External score*External factor set weight+Transition score*Transition set weight+video context score*video context factor score   (1)

Thus, based on the above formula, the object score for the object in each of the frames may be determined and stored as score data in the storage coupled to the computing device implementing the method 100.

In operation 106, the method 100 includes identifying at least one primary object and one or more secondary objects in the obtained video, based on the corresponding sets of object scores of the plurality of objects. In an embodiment, for identifying the primary object and the one or more secondary objects in the obtained video, the method 100 may include calculating a cumulative object score for each of the plurality of objects, based on the set of object scores corresponding to the object. The score data stored in the storage may be obtained and thereafter, the cumulative object score for each of the plurality of objects may be calculated. Accordingly, in an example, an object having a highest cumulative object score, among the plurality of objects, may be identified and determined as the primary object. Furthermore, objects other than the primary object may be determined as the secondary objects.

In an embodiment, an object score of the secondary objects may be further updated based on whether they are connected objects or not. The connected object may be understood as an object that is contextually correlated to the primary object. In an example, the determination as to whether a secondary objected is connected object or not may be done based on a plurality of predetermined connection factors. In an example, the predetermined connection factors may include action, direction, emotion reaction, and ROI difference. Herein, the factors are assessed with respect to the primary object. Accordingly, if the secondary object is determined to be connected to the primary object, then the score of the secondary object may be updated, by a preset value. In an example, the preset value may be specific and may be selected as per the scoring scheme used in an embodiment.

In an example, the cumulative object score for each of the objects may be stored in the score data of the storage.

In operation 108, the method 100 includes applying at least one visual effect on the primary object and at least one secondary object, from the one or more secondary objects, in at least a portion of the obtained video, for obtaining an enhanced video with the at least one visual effect applied to at least on the portion of the video. Examples of the at least one visual effect may include but are not limited to blurring, zoom-in, zoom-out, fade-in, and fade-out.

In an embodiment, after the primary and the one or more secondary objects are identified, the method 100 may include selecting the at least one secondary object on which the at least one visual effect is to be applied. In an embodiment, the selecting may include, for each frame in the portion of video, determining a secondary object having the highest corresponding object score among the one or more secondary objects, for the frame. Subsequently, the secondary object with the highest object score for the frame is selected as the at least one secondary object on which the at least one visual effect is to be applied. In an embodiment, the selecting may include, for each frame in the portion of video, determining a threshold score for the frame based on an average of the object-scores of the plurality of objects included in the frame. Subsequently, the at least one secondary object having corresponding object-score higher than the threshold score may be identified in the frame.

Accordingly, once the at least one secondary object is identified, the at least one visual effect is applied.

In an embodiment, another visual effect may be applied between two consecutive segments of the video. In an embodiment, the method 100 includes identifying a plurality of segments of the video based on a context associated with the video. Furthermore, the method 100 includes determining presence of the at least one primary object at a set of end frames of a first segment and at a set of beginning frames of a second segment, wherein the first segment and the second segment are subsequent segments. Furthermore, the method 100 includes providing a prompt to the user to apply another visual effect on the at least one primary object in the set of end frames of the first segment and in the set of beginning frames of the second segment. Furthermore, the method 100 includes receiving a user confirmation to apply the another visual effect and applying the another visual effect on the at least one primary object in the set of end frames of the first segment and in the set of beginning frames of the second segment.

FIG. 2 illustrates an apparatus 200 configured for enhancing videos, according to an embodiment. In an example, the apparatus 200 may be implemented in one or more computing device that are implementing the method 100 for enhancing videos.

In an example, the apparatus 200 may include a segment generator 202, an object detector 204, a score generator 206, a connected flow graph generator 214, and a visual effect engine 216.

In an example, the object detector 204, the score generator 206, the connected flow graph generator 214, and the visual effect engine 216 may include routines, programs, objects, components, data structures, etc., which perform particular tasks or implement data types. The object detector 204, the score generator 206, the connected flow graph generator 214, and the visual effect engine 216 may also be implemented as, signal processor(s), state machine(s), logic circuitries, and/or any other device or component that manipulate signals based on operational instructions.

Further, the object detector 204, the score generator 206, the connected flow graph generator 214, and the visual effect engine 216 may be implemented in hardware, instructions executed by at least one processing unit, for e.g., a processor, or by a combination thereof. The processing unit may be a general-purpose processor which executes instructions to cause the general-purpose processor to perform operations or, the processing unit may be dedicated to performing the required functions. In an embodiment, object detector 204, the score generator 206, the connected flow graph generator 214, and the visual effect engine 216 may be machine-readable instructions (software) which, when executed by a processor/processing unit, may perform any of the described functionalities.

In an embodiment, the object detector 204, the score generator 206, the connected flow graph generator 214, and the visual effect engine 216 may be machine-readable instructions (software) which, when executed by a processor/processing unit, perform any of the described functionalities.

In an example, the object detector 204, the score generator 206, the connected flow graph generator 214, and the visual effect engine 216 may be coupled to one or more processors of a one or more computing devices for enhancing the videos, by implementing the method 100, as described above.

In an embodiment, at least one of the object detector 204, the score generator 206, the connected flow graph generator 214, and the visual effect engine 216 may be implemented through an artificial intelligence (AI) model. A function associated with AI may be performed through the non-volatile memory, the volatile memory, and one or more processors 232 (see FIG. 2E).

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning FIGS. 2B to 2E illustrate operation of the apparatus 200, according to an embodiment.

In an embodiment, an input video may be obtained by the apparatus 200. Accordingly, in an embodiment, the segment generator 202 may be configured to segment the video into one or more segments, based on a contextual analysis of the video. As an example, consider a birthday video which includes cake cutting followed by games celebration. Based on the context, the segment generator 202 may be configured to segment the video into two segments. In an example, the segmentation of the video may be optional and may be performed only when a user of the computing device selects this option.

Figure 2B:
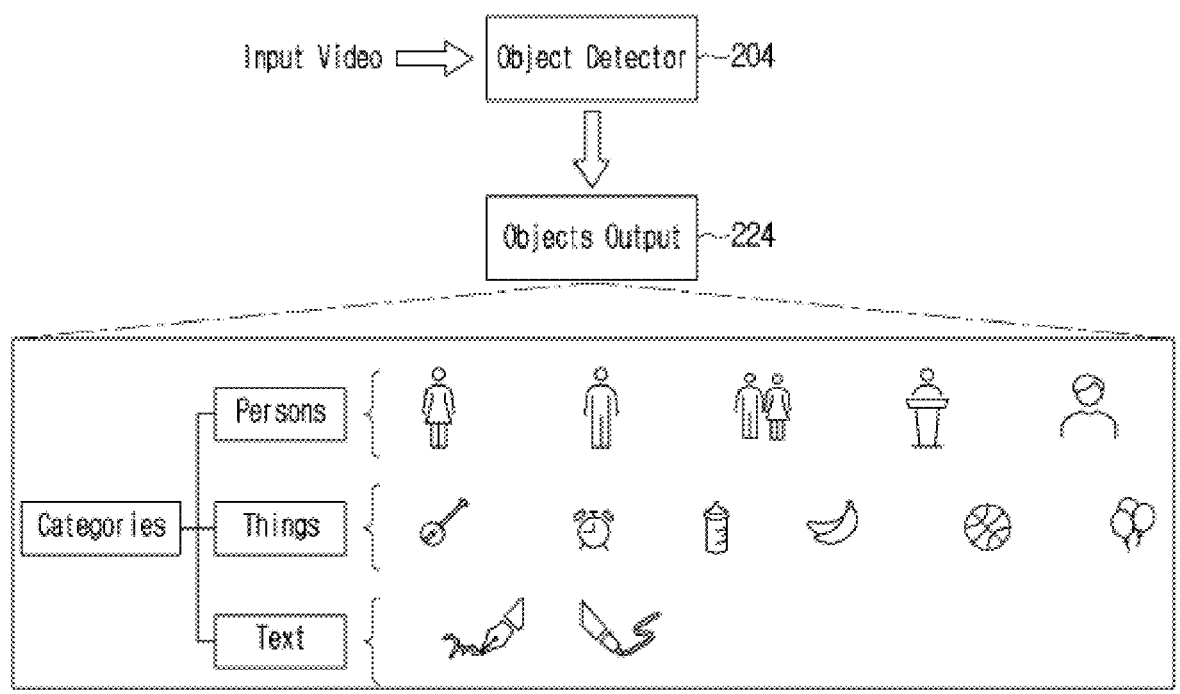
FIGS. 2B, 2C, 2D, and 2E illustrate details of operation of various components of the apparatus, according to an embodiment.

Referring to FIG. 2B, in an embodiment, the object detector 204 may be configured to process the input video. By processing the input video, the object detector 204 may be configured to determine the different types of objects present in the video. The object detector 204 may implement an object detection technique. In an example, the object detector 204 may implement or in itself be a trained model configured to identify the different objects present in the video.

In an example, the object detector 204 may be configured to classify the different objects into different categories. For instance, in the input video, different categories, such as persons, things, and text may be identified. Accordingly, the objects are classified into the categories based on their type. Thus, the object detector 204 provides an objects output 224, which may include at least one category and at least one object in the at least one category.

Figure 2C:
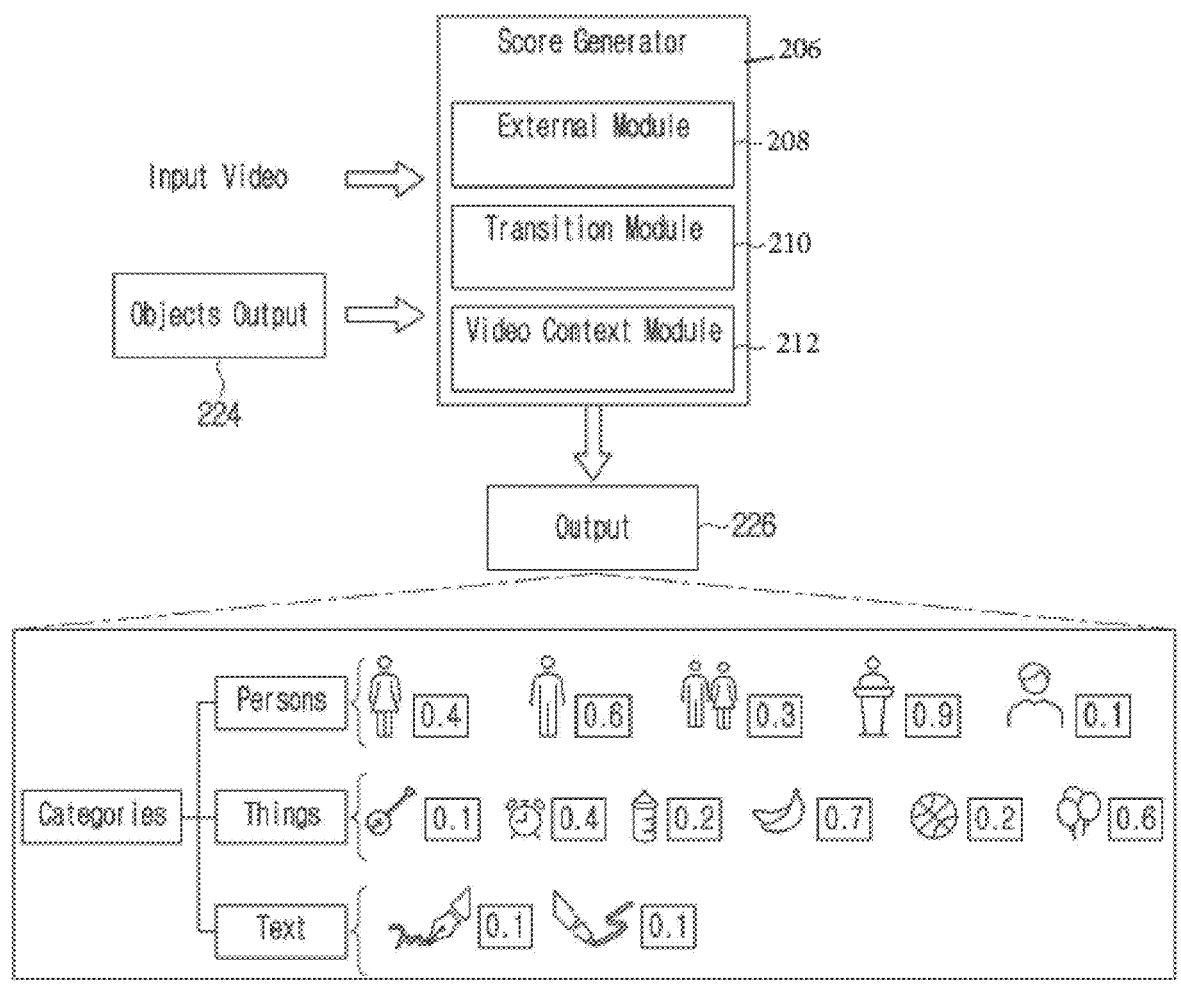

Referring to FIG. 2C, in an embodiment, the score generator 206 may be configured to generate a score for each of the object in each of the categories. In an example, the score may be determined based on all of the frames in the input video, in which a given object is appearing. In an example, the score may be determined for different segments as well, in an example, where the input video is segmented.

The score generator 206 may include an external module 208, a transition module 210, and a video context module 212. In an embodiment, the score generator 206 may be configured to take as input, the input video and the objects output 224. At first, the score generator 206 may process the entire input video, or segments, thereof, and accordingly may determine a weight for each of the set of predetermined factors.

Subsequently, for each of the objects, the score generator 206 may identify all of the frames in the input video in which the object is appearing. Thereafter, the score generator 206 may be configured to score the object in each frame based on the set of predetermined factors and the weights associated therewith. The scores for an object are collated into a set, based on which its final score may be determined. Accordingly, the score generator 206 provides an output 226. The output 226 includes both the object score of the object for each frame and the overall object score for the object.

Figure 2D:
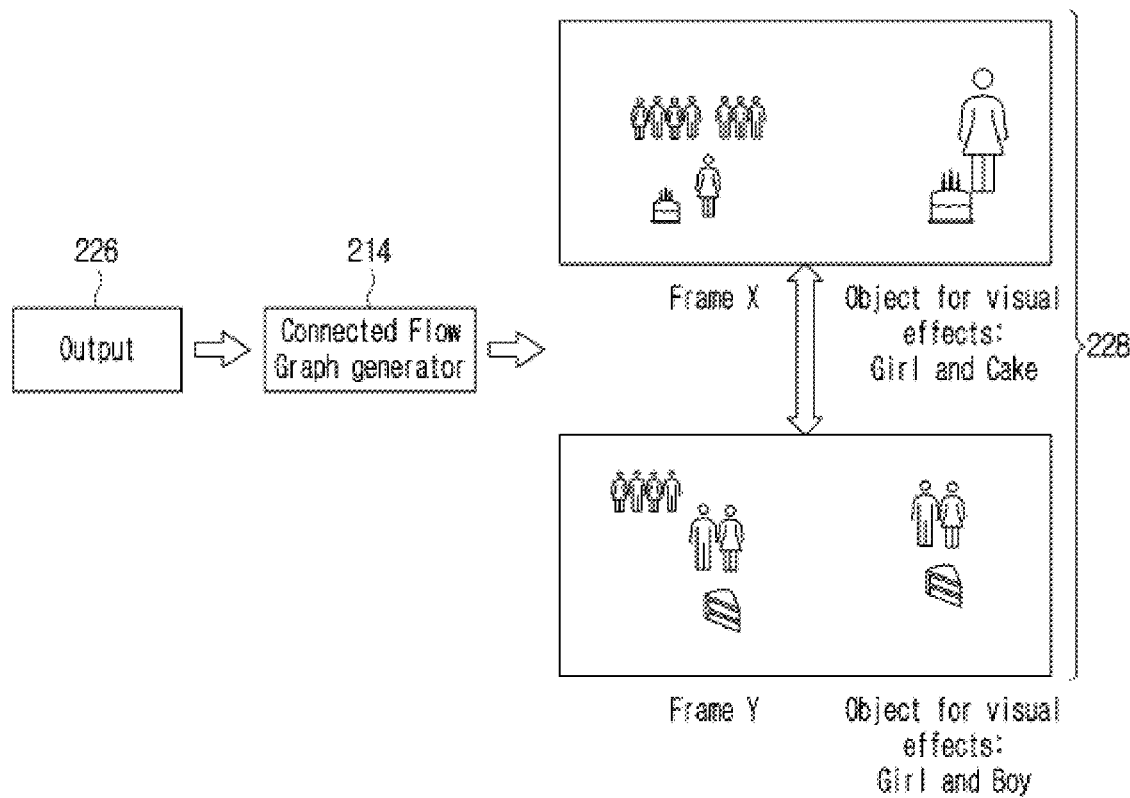

Referring to FIG. 2D, in an embodiment, the connected flow graph generator 214, hereinafter "graph generator 214", may be configured to determine a primary object and one or more secondary objects, based on the scores of the objects. More particularly, an object determined to be having a highest corresponding score in the overall video or in a given segment, may be identified to be the primary object. Furthermore, all other objects may be determined to be the secondary objects.

In an embodiment, for applicability of the visual effect to the input video, the connected flow graph generator 214 may be configured to determine a graph 228. In an example, the graph 228 may include information about the primary object and at least one secondary object for each of the frames of the input video. Herein, the at least one secondary object is an object to which the visual effect may be applied along with the primary object in the frame.

In an example, based on the graph 228, a connected flow may be determined by the graph generator 214. Herein, the connected flow may be understood as a timeline based information of the primary object and the at least one secondary objects for the plurality of frames of the video. Using the connected flow, the primary object and the at least one secondary object for each may be determined as per the timeline of the video. Thus, during the application of the visual effect, the connected flow may be utilized to learn about the primary object and the at least one secondary object on which the visual effect is to be applied, for any given time instant.

In an example, the graph 228 and the connected flow may be stored as connected flow metadata in an internal storage, or any other storage, by the processor of the computing device in which the apparatus 200 may be implemented.

The graph 228 includes a frame X and a frame Y. Herein, the graph generator 214 may be configured to ascertain that in frame X, the girl (primary object) and the cake (secondary object) are the objects to which the visual effect may be applied. In a subsequent frame(s), it may be identified that the secondary object is now a boy. Hence, the graph generator 214 may determine that the visual effect is now to be applied to the boy, along with the primary object, i.e., the girl. As the may be subsequent frames, a connectivity in the application of visual effects is maintained. As a result, when the secondary object changes as the video progresses, the relevant secondary objects are identified and the visual effect may be applied thereon.

Figure 2E:
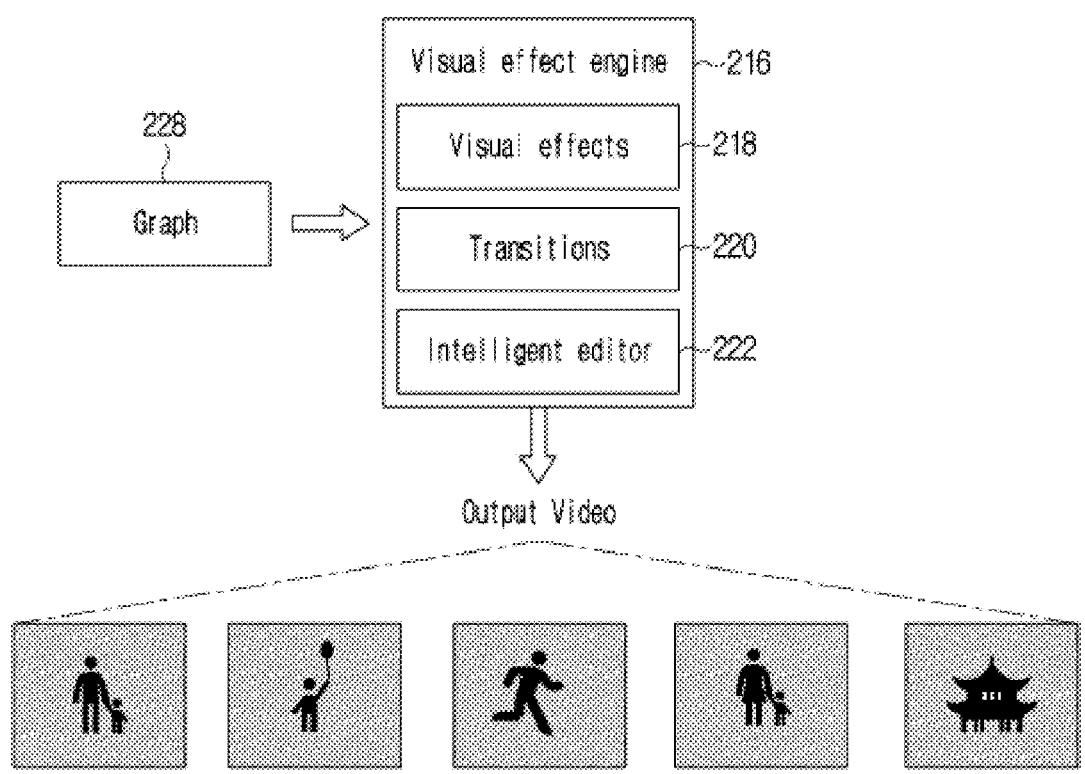

Referring to FIG. 2E, in an embodiment, the visual effect engine 216 may be configured to apply at least one visual effect on the primary object and at least one secondary object in at least a portion of the video. In an example, the visual effect engine 216 may include visual effects 218, transitions 220, and intelligent editor 222. Herein, the visual effect engine 216 may apply a visual effect that is selected as default visual effect. In an example, the visual effect engine 216 may provide the user with a list of visual effects, through a display of the computing device in which the apparatus 200 is implemented. Accordingly, the user may select a visual effect and the visual effect engine 216 may apply that effect.

In an example, the visual effect engine 216 may provide the output video, wherein the visual effect of blurring is applied to other objected, and focus is kept on the primary object and at least one secondary object(s) throughout the video. The at least one secondary object is dynamic, and is determined for each of the frames.

Figure 2F:
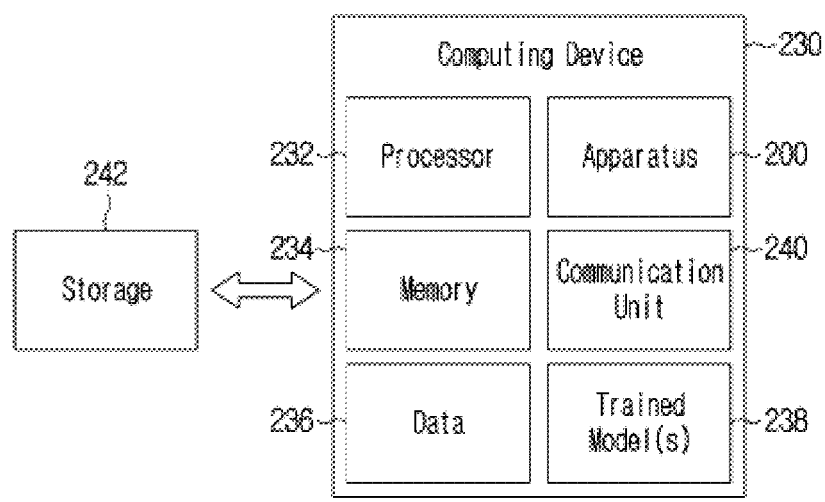
FIG. 2F illustrates a computing device, according to an embodiment.

FIG. 2F illustrates a computing device 230 implementing the apparatus 200, according to an embodiment. Examples of the computing device 230 may include, but are not limited to, smartphones, tablets, personal digital assistants, servers, laptops, desktop computers, etc. Furthermore, the apparatus 200 may be implemented either in a single device or in a distributed manner in a plurality of devices, as would be appreciated by those skilled in the art. Although the apparatus 200 is illustrated as being incorporated in the computing device 230, the apparatus 200 may be a separate apparatus and/or the apparatus 200 may include all or some of the components illustrated and described as being included in the computing device 230.

As shown, the computing device 230 may include a processor 232, memory 234, and data 236. Furthermore, the computing device 230 may include one or more trained models 238 and a communication unit 240. Furthermore, the computing device 230 may be communicatively coupled with a storage 242. The storage 242 may be either an internal storage or an external storage.

In an example, the processor 232 may be a single processing unit or a number of units, all of which could include multiple computing units. The processor 232 may be implemented as one or more microprocessors, microcomputers, microcontrollers, digital signal processors, central processing units, state machines, logic circuitries, and/or any devices that manipulate signals based on operational instructions. Among other capabilities, the processor 232 is configured to fetch and execute computer-readable instructions and data stored in the memory 234.

The memory 234 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The data 236 serves as a repository for storing data processed, received, and generated by one or more processors 232. In a non-limiting manner, one or more of the aforementioned components of the apparatus 200 may send or receive data, for example, using one or more input/output ports and one or more communication units.

The trained model(s) 238, in an example, may include one or more of machine learning based models and artificial intelligence-based models, such as, for example, neural network models, or any other models. In an example, the trained model(s) 238 may be implemented by the components of the apparatus 200 for performing the operations and steps, as described above in FIGS. 1 to 2E.

In an example, the communication unit 240 may include one or more hardware units that support wired or wireless communication between the computing device 230 and other computing devices.

Figure 3A:
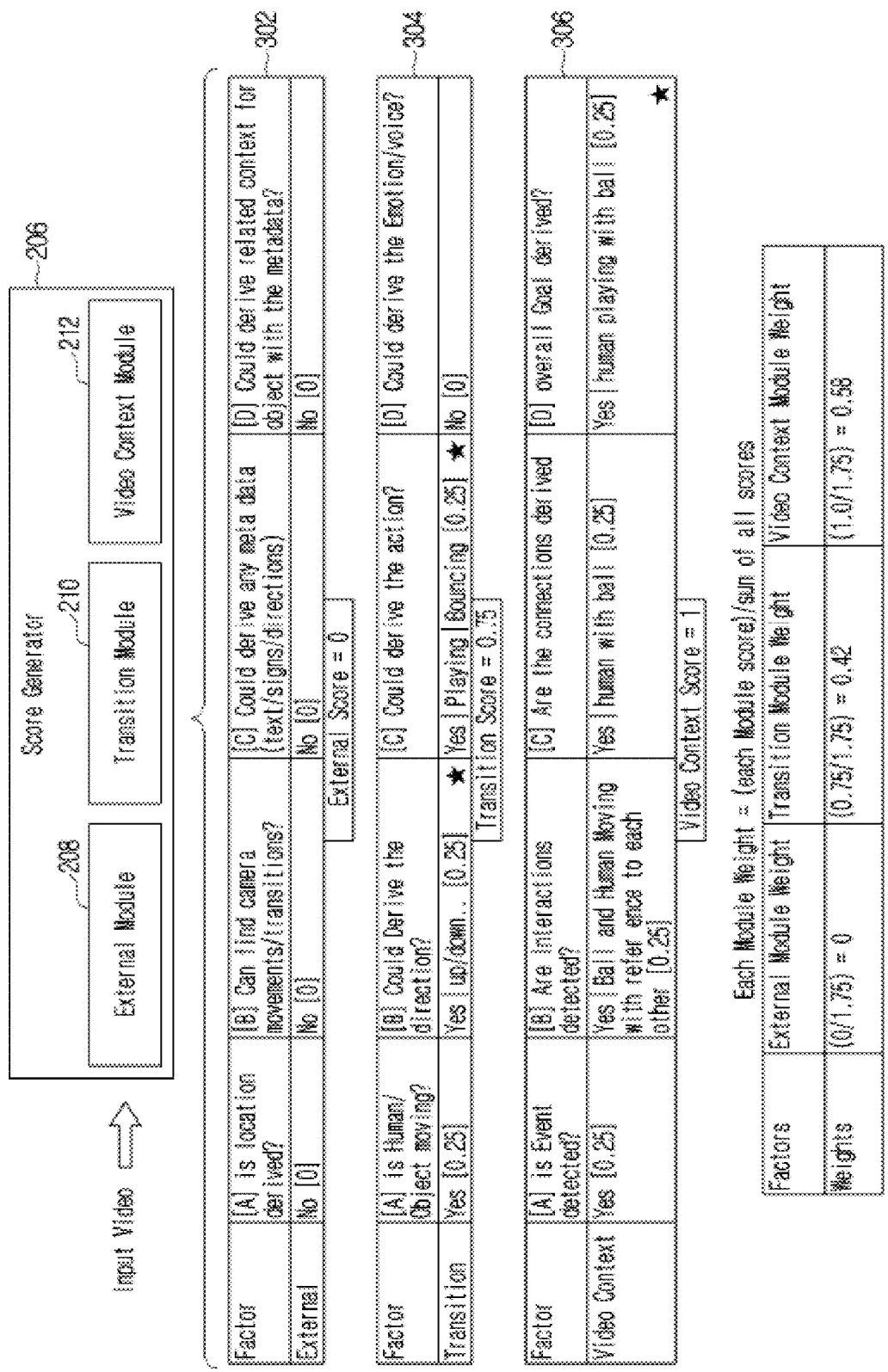
FIG. 3A illustrates operation of a score generator to determine weights corresponding to a set of predetermined factors, according to an embodiment.

FIG. 3A illustrates operation of the score generator 206 for determining weights corresponding to the set of predetermined factors, according to an embodiment. The score generator 206 may be configured to receive as input, the input video. In an embodiment, the external module 208 may be configured to process the video to determine which of a set of external factors 302 are found in the video. Accordingly, for each of the factors found in the video, a preset value, e.g., 0.25 may be added to the weight corresponding to the set of external factors. The transition module 210 may be configured to determine which of a set of transition factors 304 are present in the video, and the video context module 212 may be configured to determine which of a set of video context factors 306 are present in the video. Accordingly, the corresponding weights for the aforementioned sets are determined, respectively.

In an example, the input video may include a video of a person playing with a ball in a room and where an empty chair is present in the room. As shown in FIG. 3A, the external module 208 does not find any factor from the set of external factors 302 to be present in the video. On the other hand, two factors of the set of transition factors are determined to be present, and all of the factors of the set of video context factors are determined to be present in the video. Accordingly, as shown in FIG. 3A, weight for each of the factors is derived.

The determined weights are subsequently used for determining object scores as illustrated in FIG. 3B.

FIG. 3B illustrates operation of the score generator 206 for determining a set of object scores corresponding to a given object, according to an embodiment. The input video along with the objects output 224 may be provided as input to the score generator 206. Accordingly, for each of the one or more objects identified in the video, the score generator may determine the corresponding scores, or a set of object scores. Each object score in the set of object scores corresponds to a score of the object in a given frame of the video.

For example, objects including a human, a ball and a chair that are present in the input video are identified. Accordingly, the external module 208, the transition module 210, and the video context module 212 may be configured to determine the presence of the respective set of factors for a given object in all of the frames of the video. In other words, all of the frames of the video in which the human is appearing may be first identified. Then, an object score for each of the frame may be determined. For determining the object score of the object in a given frame, the calculation of the score as per the factors is performed.

Assuming that a scoring for a frame A is being done, none of the external factors are present for the objects. In the frame A, all transition factors for human, three transition factors for the ball, and zero transition factor for the chair are determined. Likewise, in the frame A, three video context factors for human, three video context for ball, and zero video context factors for the chair are determined.

For calculating the object score, the score for the object for a given set is multiplied by its corresponding weight, and thus, the sums for all of the factors are then combined to arrive at the final score for the object for the given frame A.

The object scores for all of the frames in which a given object is appearing and a cumulative score for the object for the entire video may be determined by the score generator.

Figure 4:
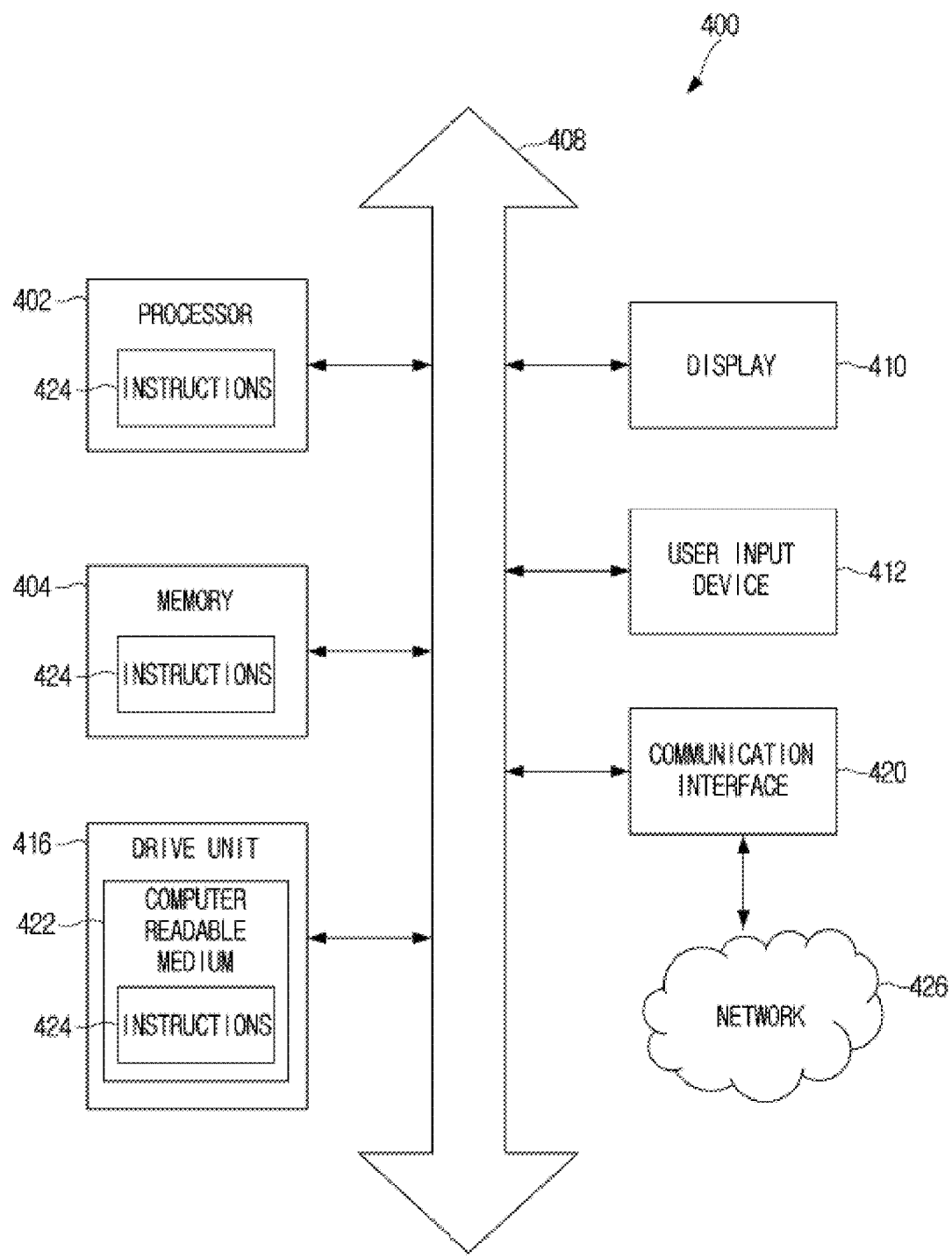
FIG. 4 depicts a computing-device based implementation of the apparatus in accordance with an embodiment.

FIG. 4 shows a computing-device based implementation of the apparatus 200 as a computer system 400 according to an embodiment. The apparatus 200 may include all or some of the components described herein as being included in the computer system 400. The computer system 400 may include a set of instructions that may be executed to cause the computer system 400 to perform any one or more of the methods described above. The computer system 400 may operate as a standalone device or may be connected, e.g., using a network, to other computer systems or peripheral devices.

In a networked deployment, the computer system 400 may be implemented as or incorporated across various devices, such as a tablet PC, a personal digital assistant (PDA), a mobile-device, a palmtop computer, a laptop computer, a desktop computer, a server, a cloud server, a remote server, a communications device, a wireless-telephone, or any other machine controllable through a wireless-network and capable of executing a set of instructions (sequential or otherwise) that specify actions to be taken by that machine. Further, while a single computer system 400 is illustrated, the term "system" shall also be taken to include any collection of systems or sub-systems that individually or jointly execute a set, or multiple-sets, of instructions to perform one or more computer functions.

The computer system 400 may include a processor 402 e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data The processor 402 may implement a software program, such as code generated manually (i.e., programmed).

The computer system 400 may include a memory 404, such as a memory 404 that may communicate via a bus 408. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, optical media and the like. In one example, the memory 404 includes a cache or random access memory for the processor 402. In alternative examples, the memory 404 is separate from the processor 402, such as a cache memory of a processor, the apparatus memory, or other memory. The memory 404 may be an external storage device or database for storing data. The memory 404 is operable to store instructions executable by the processor 402. The functions, acts or tasks illustrated or described may be performed by the programmed processor 402 executing the instructions stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 400 may further include a display 410, e.g., a touch-sensitive display, for outputting determined information as well as receiving a user's touch-gesture based inputs, such as drag and drop, single tap, multiple-taps, etc. The display 410 may act as an interface for the user to see the functioning of the processor 402, or specifically as an interface with the software stored in the memory 404 or in the drive unit 416.

Additionally, the computer system 400 may include an input device 412 configured to allow a user to interact with any of the components of the computer system 400.

Embodiments may be implemented as software containing one or more instructions that are stored in machine-readable (e.g., computer-readable) storage medium (e.g., internal memory or external memory). A processor may call instructions from a storage medium and is operable in accordance with the called instructions. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

Anon-transitory computer-readable medium refers to a medium that stores data semi-permanently, and is readable by machines, but not a medium that stores data for a short moment such as a register, a cache, and a memory. As examples of a non-transitory computer-readable medium, there may be a compact disc (CD), a digital video disc (DVD), a hard disc, a Blu-ray disc, a universal serial bus (USB), a memory card, a read only memory (ROM) and the like, but this is not limiting.

For example, a computer-readable medium 422 may include instructions 424 or receive and execute instructions 424 responsive to a propagated signal so that a device connected to a network 426 may communicate voice, video, audio, images or any other data over the network 426. Further, the instructions 424 may be transmitted or received over the network 426 via a communication port 420, e.g., an interface, or using the bus 408. The communication port 420 may be a part of the processor 402 or may be a separate component. The communication port 420 may be created in software or may be a physical connection in hardware. The communication port 420 may be configured to connect with a network 426, external media, the display 410, or any other components in the computer system 400, or combinations thereof. The connection with the network 426 may be established wirelessly as discussed later. Likewise, the additional connections with other components of the computer system 400 may be established wirelessly. The network 426 may alternatively be directly connected to the bus 408.

The network 426 may include wireless networks that may be a cellular telephone network, an 802.11, 802.16, 802.20, 802.1Q or WiMax network. Further, the network 426 may be a public network, such as the Internet, a private network, such as an intranet, or combinations thereof, and may utilize a variety of networking protocols now available or later developed including, but not limited to TCP/IP based networking protocols. An embodiment is not limited to operation with any particular standards and protocols. For example, standards for Internet and other packet switched network transmission (e.g., TCP/IP, UDP/IP, HTML, HTTP) may be used.

Embodiments provide for selectively applying visual effects not only to an identified primary object, but also to at least one secondary object that is present in the video. Furthermore, the at least one secondary object may be dynamic and may be changing as per the progress of the video. In an embodiment, the changing secondary objects are automatically identified and, thus, a seamless application of the visual effect to the dynamic secondary objects is provided.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A computer-implemented method of enhancing videos, the computer-implemented method comprising:
   obtaining, from a storage, a video to be enhanced, based on a selection of a user;
   determining sets of object scores for a plurality of objects in the video, respectively, based on a set of predetermined factors, wherein the set of predetermined factors comprises a set of external factors, a set of transition factors, and a set of video context factors;
   identifying a primary object and one or more secondary objects in the video, among the plurality of objects, based on the sets of object scores; and
   applying at least one visual effect to the primary object and at least one secondary object from the one or more secondary objects, in at least a portion of the video, for obtaining an enhanced video with the at least one visual effect applied to at least the portion of the video,
   wherein the determining the sets of object scores comprises:
   for each of the plurality of objects:
   identifying a set of frames of the video in which a respective object among the plurality of objects is appearing;
   determining an object score for the respective object for each frame of the set of frames, based on the set of predetermined factors;
   including the determined object score for each frame in a set of object scores corresponding to the respective object; and
   storing the set of object scores corresponding to the respective object in the storage.

2. The computer-implemented method as claimed in claim 1,
   wherein the determining the object score further comprises:
   calculating a weight corresponding to each of the set of external factors, the set of transition factors, and the set of video context factors;
   computing an external factor score, a transition score, and a video context score for the respective object, based on the set of external factors, the set of transition factors, and the set of video context factors, respectively; and
   determining the object score for the respective object based on the calculated weight, the external factor score, the transition score, and the video context score.

3. The computer-implemented method as claimed in claim 1, wherein the identifying the primary object and the one or more secondary objects further comprises:
   calculating a cumulative object score for each of the plurality of objects, based on the set of object scores, respectively;
   identifying, as the primary object, one object among the plurality of objects that has a highest cumulative object score among cumulative object scores of the plurality of objects; and
   identifying one or more objects other than the identified primary object as the one or more secondary objects.

4. The computer-implemented method as claimed in claim 3, further comprising:
   determining, for each of the one or more secondary objects, whether a respective secondary object is a connected object, based on a plurality of predetermined connection factors, wherein the connected object is contextually correlated with the primary object; and
   increasing the determined object score of the respective secondary object by a preset value, based on the respective secondary object being determined to be the connected object contextually correlated with the primary object.

5. The computer-implemented method as claimed in claim 3, further comprising selecting the at least one secondary object to which the at least one visual effect is to be applied, the selecting comprising:
for each frame in the portion of the video:
identifying a secondary object among the one or more secondary objects that has a highest cumulative object score among the cumulative object scores of the one or more secondary objects, for a respective frame; and
selecting the identified secondary object as the at least one secondary object to which the at least one visual effect is to be applied in the respective frame.

6. The computer-implemented method as claimed in claim 3, further comprising selecting the at least one secondary object to which the at least one visual effect is to be applied, the selecting comprising:
for each frame in the portion of the video:
determining a threshold score for a respective frame based on an average of the object scores of the plurality of objects included in the frame;
identifying the at least one secondary object as an object having a corresponding object score higher than the threshold score among the one or more secondary objects; and
selecting the identified at least one secondary object as the at least one secondary object to which the at least one visual effect is to be applied in the respective frame.

7. The computer-implemented method as claimed in claim 1, further comprising:
identifying a plurality of segments of the video based on a context associated with the video;
determining that the primary object is present in a set of end frames of a first segment and a set of beginning frames of a second segment, wherein the first segment and the second segment are subsequent segments;
providing a prompt to the user to apply another visual effect to the primary object in the set of end frames of the first segment and the set of beginning frames of the second segment, the another visual effect being different from the at least one visual effect;
receiving a user confirmation to apply the another visual effect; and
applying the another visual effect to the primary object in the set of end frames of the first segment and the set of beginning frames of the second segment.

8. The computer-implemented method as claimed in claim 7, wherein each of the at least one visual effect and the another visual effect comprises one of blurring, zoom-in, zoom-out, fade-in, or fade-out.

9. The computer-implemented method as claimed in claim 1, wherein the portion of the video comprises one of a complete runtime of the video, a user-determined segment of the video, or an auto-identified segment of the video.

10. An apparatus configured to enhance videos, the apparatus comprising:
a memory;
a communication unit; and
a processor coupled to the memory and the communication unit, wherein the processor is configured to:
obtain, from a storage, a video to be enhanced, based on a selection of a user,
determine sets of object scores for a plurality of objects in the video, respectively, based on a set of predetermined factors, wherein the set of predetermined factors comprises a set of external factors, a set of transition factors, and a set of video context factors,
identify a primary object and one or more secondary objects in the video, among the plurality of objects, based on the sets of object scores, and
apply at least one visual effect to the primary object and at least one secondary object, from the one or more secondary objects, in at least a portion of the video, for obtaining an enhanced video with the at least one visual effect applied to at least the portion of the video,
wherein, for each of the plurality of objects, the processor is further configured to:
identify a set of frames of the video in which a respective object is appearing,
determine an object score for the respective object for each frame of the set of frames, based on the set of predetermined factors,
include the determined object score for each frame in a set of object scores corresponding to the respective object, and
store the set of object scores corresponding to the respective object in the storage.

11. The apparatus as claimed in claim 10, wherein the processor is further configured to:
calculate a weight corresponding to each of the set of external factors, the set of transition factors, and the set of video context factors,
compute an external factor score, a transition score, and a video context score for the respective object, based on the set of external factors, the set of transition factors, and the set of video context factors, respectively, and
determine the object score for the respective object based on the calculated weight, the external factor score, the transition score, and the video context score.

12. The apparatus as claimed in claim 10, wherein the processor is further configured to:
calculate a cumulative object score for each of the plurality of objects, based on the set of object scores, respectively,
identify, as the primary object, one object among the plurality of objects that has a highest cumulative object score among cumulative object scores of the plurality of objects, and
identify one or more objects other than the identified primary object as the one or more secondary objects.

13. The apparatus as claimed in claim 12, wherein the processor is further configured to:
determine, for each of the one or more secondary objects, whether a respective secondary object is a connected object, based on a plurality of predetermined connection factors, wherein the connected object contextually correlated with the primary object, and
increase the determined object score of the respective secondary object by a preset value, based on the respective secondary object being determined to be the connected object contextually correlated with the primary object.

14. The apparatus as claimed in claim 12, wherein, for each frame in the portion of the video, the processor is further configured to:
identify a secondary object among the one or more secondary objects that has a highest cumulative object score among the cumulative object scores of the one or more secondary objects, for a respective frame, and
select the identified secondary object as the at least one secondary object to which the at least one visual effect is to be applied in the respective frame.

15. The apparatus as claimed in claim 12, wherein, for each frame in the portion of the video, the processor is further configured to:
- determine a threshold score for a respective frame based on an average of the object scores of the plurality of objects included in the frame,
- identify the at least one secondary object as an object having a corresponding object score higher than the threshold score among the one or more secondary objects, and
- select the identified secondary object as the at least one secondary object to which the at least one visual effect is to be applied in the respective frame.

16. The apparatus as claimed in claim 10, wherein the processor is further configured to:
- identify a plurality of segments of the video based on a context associated with the video,
- determine that the primary object is present in a set of end frames of a first segment and a set of beginning frames of a second segment, wherein the first segment and the second segment are subsequent segments,
- provide a prompt to the user to apply another visual effect to the primary object in the set of end frames of the first segment and the set of beginning frames of the second segment, the another visual effect being different from the at least one visual effect,
- receive a user confirmation to apply the another visual effect, and
- apply the another visual effect to the primary object in the set of end frames of the first segment and the set of beginning frames of the second segment.

17. The apparatus as claimed in claim 16, wherein each of the at least one visual effect and the another visual effect comprises one of blurring, zoom-in, zoom-out, fade-in, or fade-out.

18. The apparatus as claimed in claim 10, wherein the portion of the video comprises one of a complete runtime of the video, a user-determined segment of the video, or an auto-identified segment of the video.

\* \* \* \* \*